US012631013B2

(12) United States Patent　　(10) Patent No.: US 12,631,013 B2

Halliwell　　(45) Date of Patent: May 19, 2026

(54) SUPPORT STRUCTURE AND METHOD OF FORMING A SUPPORT STRUCTURE

(71) Applicant: HC Properties Inc, Clinton (CA)

(72) Inventor: John Martin Halliwell, Clinton (CA)

(73) Assignee: HC Properties Inc., Clinton (CA)

( * ) Notice: Subject to any disclaimer, the term of this patent is extended or adjusted under 35 U.S.C. 154(b) by 833 days.

(21) Appl. No.: 17/697,445

(22) Filed: Mar. 17, 2022

(65) Prior Publication Data

US 2022/0299133 A1　Sep. 22, 2022

(51) Int. Cl.
| | |
|---|---|
| *E03F 3/06* | (2006.01) |
| *B28B 21/42* | (2006.01) |
| *E01F 5/00* | (2006.01) |
| *E04C 5/07* | (2006.01) |
| *E04C 5/08* | (2006.01) |
| *E04C 5/12* | (2006.01) |
| *F16L 9/08* | (2006.01) |
| *F16L 55/18* | (2006.01) |

(52) U.S. Cl.
CPC ................ *E03F 3/06* (2013.01); *B28B 21/42* (2013.01); *E01F 5/005* (2013.01); *E04C 5/07* (2013.01); *E04C 5/08* (2013.01); *E04C 5/085* (2013.01); *E04C 5/127* (2013.01); *F16L 9/085* (2013.01); *F16L 55/18* (2013.01); *E03F 2003/065* (2013.01)

(58) Field of Classification Search
CPC ....... E01F 5/005; E03F 3/06; E03F 2003/065; E04C 5/07; E04C 5/08; E04C 5/085; E04C 5/127; B28B 21/42; F16L 9/085; F16L 55/18
See application file for complete search history.

(56) References Cited

U.S. PATENT DOCUMENTS

| | | | | | |
|---|---|---|---|---|---|
| 2,522,165 | A | * | 9/1950 | Crom | ......................... F16L 9/08 |
| | | | | | 138/176 |
| 2,674,115 | A | * | 4/1954 | Chalos | ...................... E04C 5/08 |
| | | | | | 52/223.14 |
| 2004/0231789 | A1 | * | 11/2004 | Blackmore | ........... F16L 55/179 |
| | | | | | 138/98 |
| 2009/0038702 | A1 | * | 2/2009 | Fyfe | ...................... F16L 55/162 |
| | | | | | 138/172 |

FOREIGN PATENT DOCUMENTS

| | | | | | |
|---|---|---|---|---|---|
| CN | 209832836 | U | * | 12/2019 | |
| CN | 111042443 | A | * | 4/2020 | |
| DE | 202005019077 | U1 | * | 5/2007 | ............... E04B 5/43 |
| EP | 1630465 | A1 | * | 3/2006 | .............. F16L 58/06 |
| JP | 2016098983 | A | * | 5/2016 | |
| KR | 20110100951 | A | * | 9/2011 | |
| KR | 20110139989 | A | * | 12/2011 | |
| KR | 101241483 | B1 | * | 3/2013 | |
| WO | WO-9809042 | A1 | * | 3/1998 | ............... E04C 5/07 |
| WO | WO-2007060489 | A1 | * | 5/2007 | ......... B28B 19/0023 |
| WO | WO-2021063453 | A1 | * | 4/2021 | ............... E04C 5/07 |

* cited by examiner

*Primary Examiner* — Jessie T Fonseca

(74) *Attorney, Agent, or Firm* — Teitelbaum & Bouevitch; Neil Teitelbaum

(57) ABSTRACT

Two lengths of FRP rebar are formed into spirals and coupled at cross over locations to form a structure to be embedded into a cementitious material or covered in a cementitious material for repairing a form or in new construction.

8 Claims, 7 Drawing Sheets

SUPPORT STRUCTURE AND METHOD OF FORMING A SUPPORT STRUCTURE

CROSS REFERENCE TO RELATED APPLICATIONS

This application claims priority from Canadian Patent Application No. 3,112,125 filed Mar. 17, 2021 and incorporated herein by reference in their entirety.

FIELD

This invention relates generally to the field of construction and more particularly to constructing or repairing large structures, such as but not limited to culverts, sewers and the like and provides environmentally friendly, holistic solution.

BACKGROUND

Concrete is very strong in compression, but relatively weak in tension. To compensate for this imbalance in concrete's behavior, reinforcement bars called rebars are cast into the concrete to carry the tensile structural load. Steel rebar has been commonly used for reinforcement.

More recently, reinforcement bar produced from continuous fiber, such as Basalt rebar has been found to be superior to steel in both pervious and non-pervious concrete. Basalt bar does not corrode.

In North America, steel rebar is typically used to reinforce concrete. Unfortunately, while the initial bond between reinforcing steel bars and concrete is strong, the steel can deteriorate within the concrete. A particular concern is rebar that spans a cold joint in the concrete. Cold joints can let in water and when steel rebar rusts it expands and this splits open the concrete letting yet more water in that causes even more rusting. This common concrete failure mode is called spalling.

In order to solve this problem, rebar can be galvanized, however there is a substantial monetary and environmental cost associated with galvanizing steel.

This invention uses a fiber reinforced polymer (FRP) rebar such as Basalt rebar which is sometimes referred to as "rock rebar". Basalt rebar is more environmentally stable than steel rebar and is comparable in cost and in some instances less than the cost of steel rebar. Because Basalt rebar does not corrode, it was developed to be used in harsh environments such as sea walls and road bridges. One of the major problems the construction industry faces today is corrosion of reinforcing steel, which significantly affects the life and durability of concrete structures. Basalt rebar effectively obviates this problem.

Basalt rebar is made from a plentiful volcanic rock called Basalt. Magma in the earth's core is primary Basalt. The composition of Basalt rock may vary.

Relative to most common igneous rocks, Basalt compositions are rich in MgO and CaO and low in $SiO_2$ and the alkali oxides. Basalt generally has a composition of 45-52 wt % $SiO_2$, 2-5 wt % total alkalis, 0.5-2.0 wt % $TiO_2$, 5-14 wt % FeO and 14 wt % or more $Al_2O_3$.

Basalt fibers are manufactured in a single stage process by melting pure Basalt rock raw material. Basalt filaments are made by melting crushed volcanic basalt rock of a specific mineral mixture to 1,700° C. for 6 hours. The white hot material is subsequently drawn through platinum bushings and then cooled into fibers. The fibers cool into hexagonal chains resulting in a resilient structure substantially stronger than steel or fiberglass.

Basalt rebar is manufactured from continuous Basalt filaments and epoxy polymers, typically in a ratio of 80% Basalt fibers and 20% resin. To provide better adhesion to concrete the Basalt rebar is provided with a wound spiral thread around its periphery or the surface can be embedded with sand for better adhesion to concrete.

Basalt rebar is approximately 2.5 times stronger in tensile strength than series 60 steel rebar of the same diameter, and the tensile strength of continuous basalt fibers is about twice that of E-glass fibers and the modulus of elasticity is about 15-30% higher. Another advantage of Basalt fibers is that the thermal expansion coefficient is very close to that of concrete whereas steel is not. Hence, this lessens concrete cracking as temperatures vary. Basalt rebar is environmentally safe and is inert and non-toxic. The production process of Basalt fiber creates no environmental waste and it is non-toxic in use or recycling.

Basalt rebar weighs less than steel and its strength to weight ratio is 7.5 times greater than steel. Thus shipping costs are less than that of steel preserving its small environmental footprint compared to steel.

This invention provides a green solution to build structures or repair existing structures, such as sewers, culverts and pipes of various diameter and cross-section.

SUMMARY

In accordance with an aspect of this invention a method of forming a reinforcing structure onto a form, is provided, comprising:
- a. providing a first length of FRP rebar adjacent to the form so that at least a portion of the FRP
- b. rebar is arranged in a spiral pressing against the form at a plurality of locations;
- c. providing a second length of FRP rebar adjacent to the first length of FRP rebar
- d. so that a portion of the first and second lengths form spirals following different paths and conform to the form, wherein the first length and the second length of FRP rebar cross over each other at a plurality of locations and are coupled together at a plurality of said locations; and, covering at least a portion of the first and second lengths with a cementitious material.

In accordance with another aspect of the invention, there is provided a reinforced structure comprising:
- a. an initial form requiring reinforcement;
- b. a first length of FRP rebar formed into a spiral and contacting the initial form;
- c. a second length of FRP rebar formed into a second spiral and contacting the initial form;
- d. wherein portions of the first length of FRP rebar criss-cross portions of the second length of FRP rebar at a plurality of locations; and wherein the first length of FRP rebar and second length of FRP rebar are coupled together at a plurality of said locations; and,
- e. a cementitious material covering a substantial portion of the first length and second length of FRP rebar and some of the initial form.

In accordance with this invention there is provided a structure comprising:
- a. a first length of FRP rebar shaped in a first spiral; and,
- b. a second length of FRP rebar shaped in a second spiral, wherein the first and second lengths of FRP rebar formed in spirals cross over each other at a plurality of locations, and wherein some of those locations are coupled together.

In accordance with a preferred embodiment Basalt FRP is used.

BRIEF DESCRIPTION OF THE DRAWINGS

Exemplary embodiments of the disclosure will now be described in accordance with the drawings in which.

DETAILED DESCRIPTION

Figure 1:
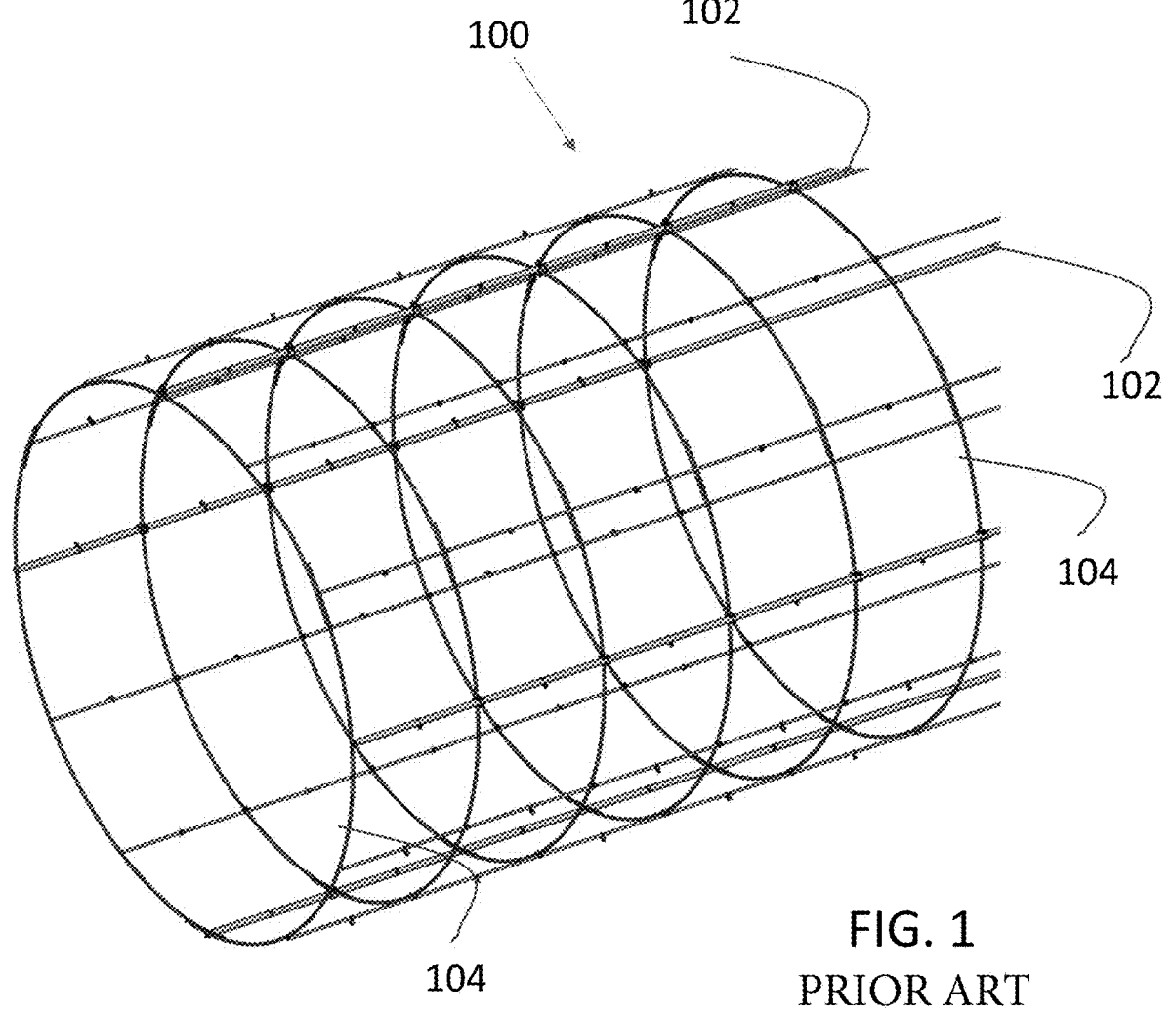
FIG. 1 is a prior art isometric view of a metal rebar frame.

Referring now to FIG. 1 a prior art structure formed of lengths of steel rebar 102 coupled with steel rebar hoops 104 is shown which forms a supporting structure upon which to apply a coat of cementitious material. The rebar structure 100 provides strength and support to the coating of cement applied overtop and lessens the likelihood of cracking. The rebar is standard steel rebar which has the advantage of being highly ductile, but also has the disadvantage of easily corroding in the presence of water and being very heavy compared to FRP rebar. When steel rebar is used to repair old deteriorating culverts and sewers there is always a concern about water seeping into the concrete and adversely affecting the steel rebar. Building the structure 100 below is also quite labor intensive, especially when erecting a rebar cage in large culverts where many hoops 204 and parallel cross rebar members 102 are required. This is also done in a damp or wet environment where steel rebar is likely to rust even during the installation and repair.

Figure 2:
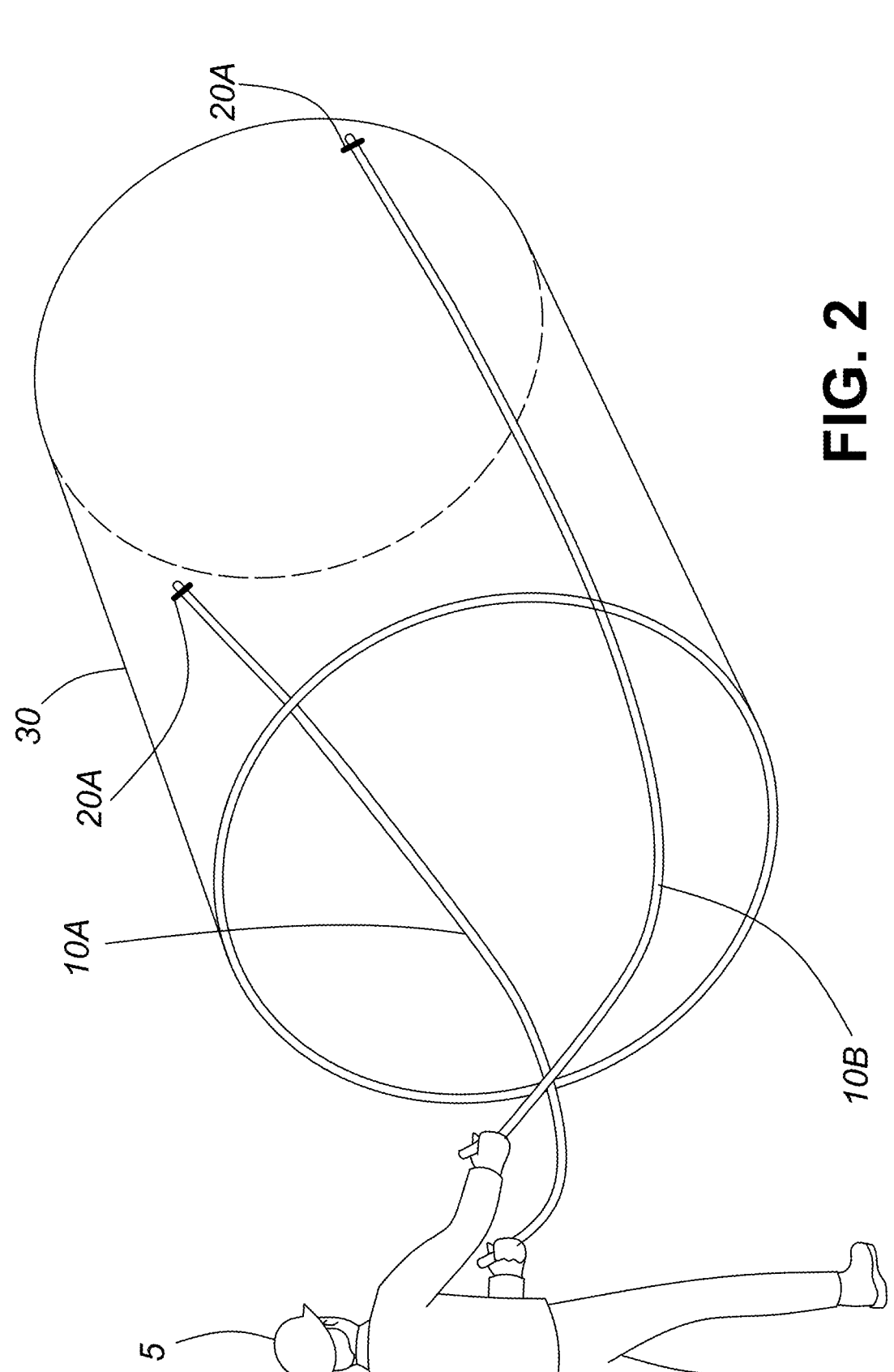
FIG. 2 is a drawing in which FRP rebar is inserted into a culvert in preparation for spiraling.
Figure 3:
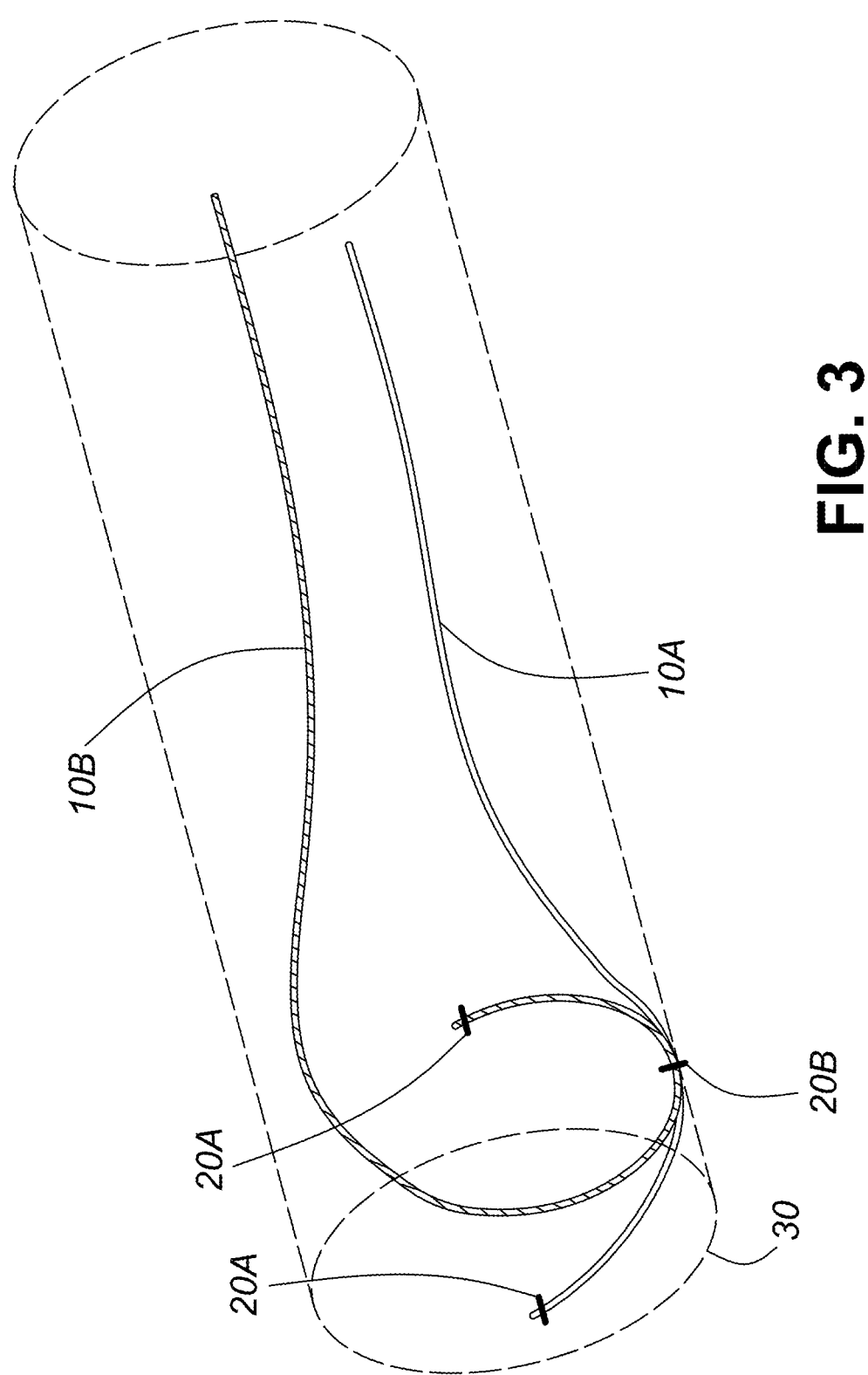
FIG. 3 illustrates the start of a spiraling operation.
Figure 4:
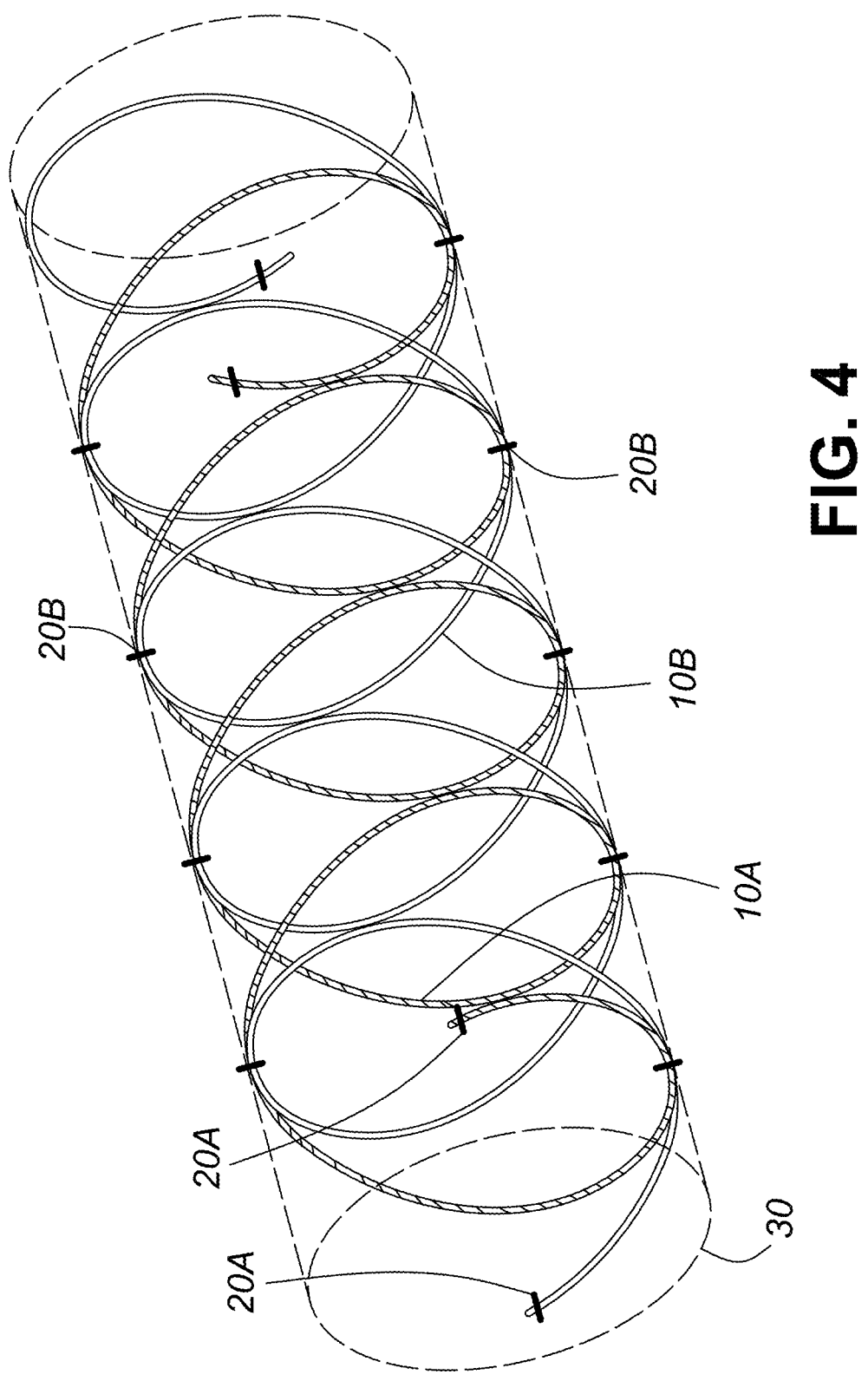
FIG. 4 illustrates two spiraled FRP rebars secured in position before grouting.

FIGS. 2, 3 and 4 show an alternative embodiment of a structure, in accordance with the disclosure where a less labour intensive, system is erected in a very short amount of time and where two workers can erect the structure. No welding is required. The rebar used is fiber reinforced polymer (FRP) rebar which comes in many forms. It can be made of Basalt fibers, glass fiber, or carbon fiber. Notwithstanding, all of these FRP rebars have a similar characteristic that lends to this invention. They have above adequate tensile strength, are lightweight, and do not corrode. Longer lengths of these FRP rebar types bend easily but are resilient and spring back from a bent form when released. Notwithstanding, if the bend radius is too small, the FRP will be damaged so care must be taken to ensure that the bend radius is suitable for the size and type of FRP rebar. The resilience of FRP rebar is not found in typical steel rebar and is useful when positioning a length from a large diameter coils to form spiral. For example when steel rebar is bent, it remains bent. However, Basalt rebar when bent or coiled then fully released will spring back to a nearly straight form. If it is coiled and released from being held in a coil it will uncoil itself. Turning now to FIG. 2 two lengths of 8 mm FRP rebar, 10A and 10B, preferably 8 mm Basalt rebar is inserted into a culvert 30 in need of repair. The person, 5, shows where the person stands. First ends of the rebar are fixed at 3'oclock and 9'o'clock positions at a far end of the culvert 30 while an operator holds two other ends of the Basalt rebar. The operator pushes both lengths of rebar 10A and 10B into the culvert with moderate the force and interlaces both lengths into two spirals. This is illustrated more clearly in FIGS. 3 and 4. It should be noted that by interlacing the lengths of FRP Basalt rebar they alternately cross over each other, 10A crossing over 10B and 10B crossing over 10A. Plastic ties 20A and 20B secure the rebar and couple portions which cross over each other together. FIG. 4 shows a completed construction. After the frame structure is completed cementitious material such as grout or concrete is applied over it, concealing the rebar and providing a supportive layer to repair the culvert. In an alternative embodiment, a grout tube having slits therein, follows one or both of the rebar lengths 10A and 10B and is coupled thereto. A skin in the form of a plastic cover may subsequently be applied over the rebar and grout tube after which grout is injected into the grout tube (not shown) and the grout fills the void between the culvert inner wall 30 and the plastic cover providing a sandwich of layers consisting of concrete reinforced with rebar support structure and a plastic wall.

Figure 4A:
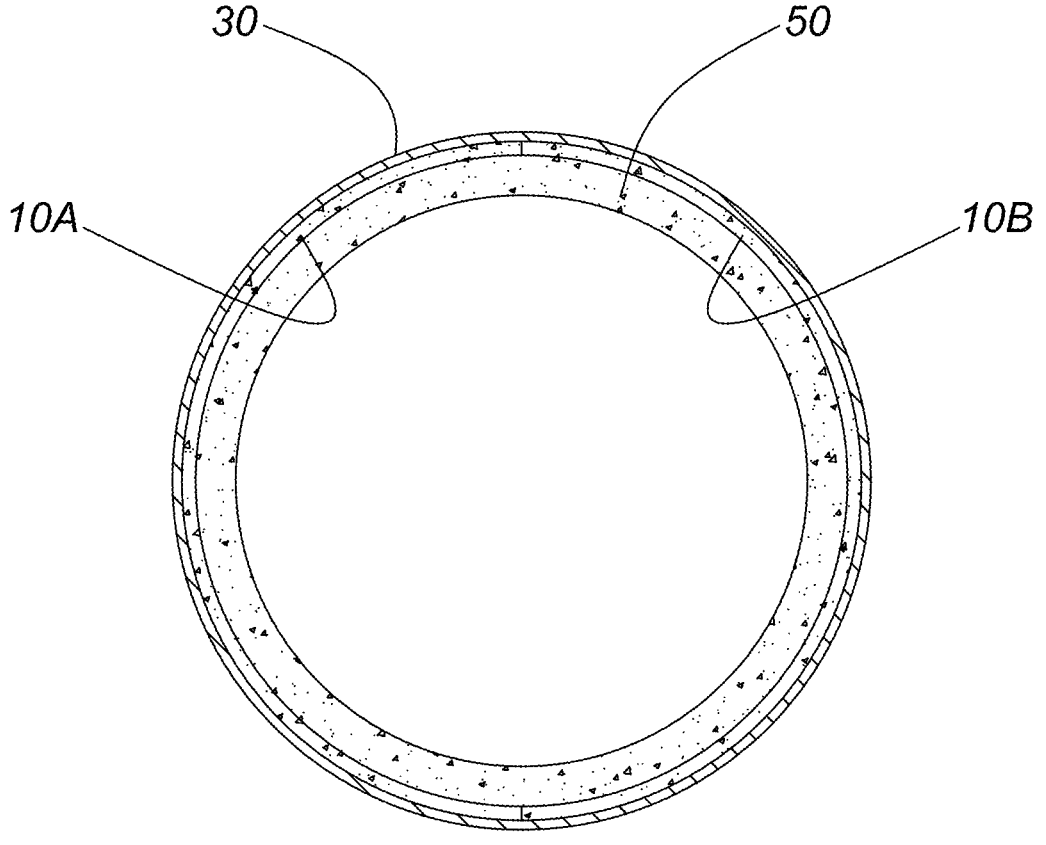
FIG. 4a is a cross-sectional view of the culvert and rebar of FIG. 4

FIG. 4A is cross section of the culvert 30 shown in FIG. 4 illustrating the rebar 10A and 10B covered in a layer of grout and Cementous material 50.

Figure 5:
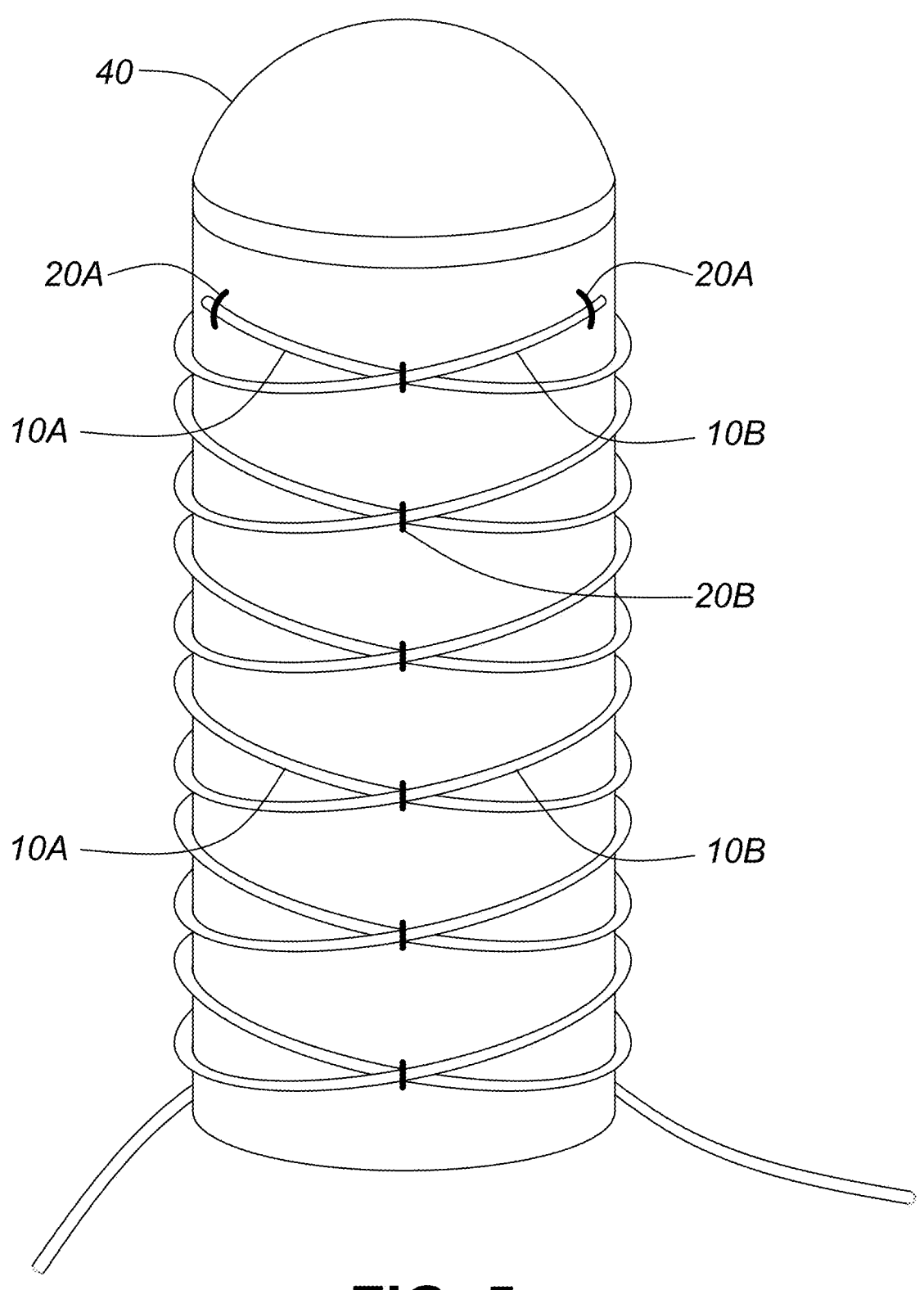
FIG. 5 shows an alternative embodiment where the FRP rebar is spiraled onto the exterior of a form.

Although the FRP rebar 10A and 10B is shown supporting an inner wall of a culvert 30, FIG. 5 shows an alternative embodiment where a form consisting of a concrete grain silo 40 is wrapped in FRP Basalt rebar in two overlapping spirals before a layer of cementitious material is applied over the rebar.

Figure 5A:
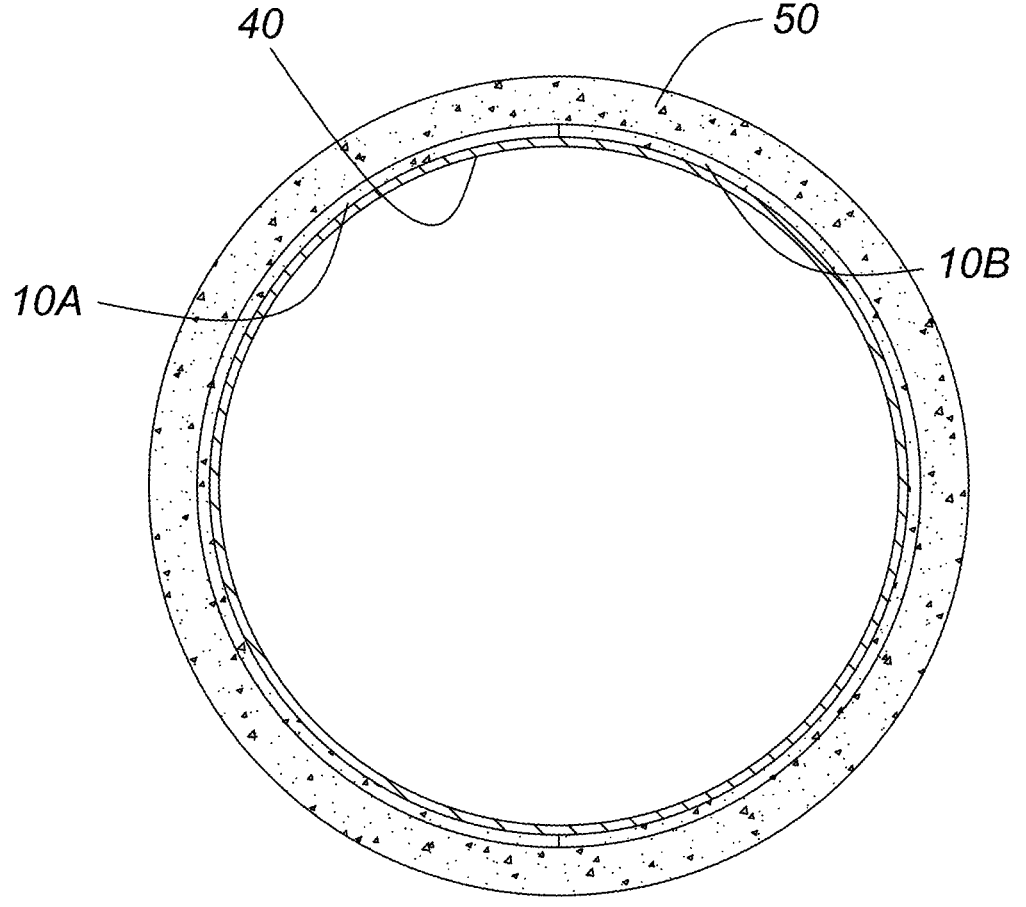
FIG. 5A is a cross-section of the drawing shown in FIG. 5.

FIG. 5A is cross section of the grain silo 40 shown in FIG. 5 illustrating the rebar 10A and 10B covered in a layer of Cementous material 50.

As long as the FRP rebar is maintained in a spiral it is constantly under tension adding a small amount of tension against the form or culvert it is within. This is seen as an advantage, since in the construction industry compressive stresses are sometimes purposely introduced to produce prestressed concrete either by pre-tensioning or post-tensioning the steel reinforcement. The other advantage of the spiral being under tension is that is remains in place as long as the ends are held in a fixed position, so that it cannot unwind. This eases construction of two spiral lengths of FRP rebar within or upon a form. If rebar was limp, or overly stiff it would be difficult to form it into a spiral, however due to the nature of FRP rebar, it lends itself to being formed into a spiral conforming to the inside of a culvert and obviates the more complex construction shown in FIG. 1. It should be noted that although preferable to used two separate lengths of FRP rebar, it may be possible to use a single length where the middle is placed at one end of the culvert and the two lengths on either side of the middle overlap each other in spirals, where one overlaps the other in an alternating pattern.

What is claimed is:

1. A method of reinforcing a pipe, comprising:
inserting two lengths of FRP rebar into the pipe so that each length of the FRP rebar is arranged in a spiral under tension, so that it presses against an interior wall of the pipe at a plurality of locations along the interior wall of the pipe, such that the spirals follow different paths and conform to the interior wall of the pipe, wherein the two lengths of the FRP rebar cross over each other at a plurality of locations along the two lengths of the FRP rebar and are coupled together with ties at at least some of the plurality of locations along the length of the rebar; and, covering at least a portion of the two lengths of the FRP rebar with a cementitious material.

2. The method as defined in claim 1, wherein the pipe is a culvert or sewer pipe and wherein the two lengths of the FRP rebar are separate lengths of basalt FRP rebar.

3. The method as defined in claim 1, wherein the two lengths of the FRP rebar are intertwined so that a first length of the FRP rebar overlaps a second length of the FRP rebar at a first plurality of locations along the length of the pipe and wherein the second length of the FRP rebar overlaps the first length of the FRP rebar at a second plurality of locations along the length of the pipe.

4. The method as defined in claim 3, where the first and second lengths of FRP rebar are basalt rebar.

5. The method as defined in claim 3, where the two lengths of FRP rebar each include a plurality of constituents.

6. The method as defined in claim 1, wherein the first and second lengths of FRP rebar are each contiguous single length of rebar.

7. The method as defined in claim 1 wherein the FRP rebar is basalt fiber reinforced polymer reinforcing bar.

8. The method as defined in claim 5 wherein the FRP rebar contains basalt filament and epoxy polymer.

\* \* \* \* \*